D. W. S. Rawson.
Multiplying Reflectors for Photographic Cameras
Nº 71911          Patented Dec. 10, 1867.
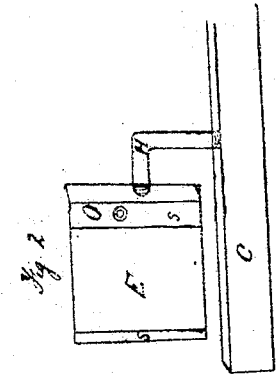
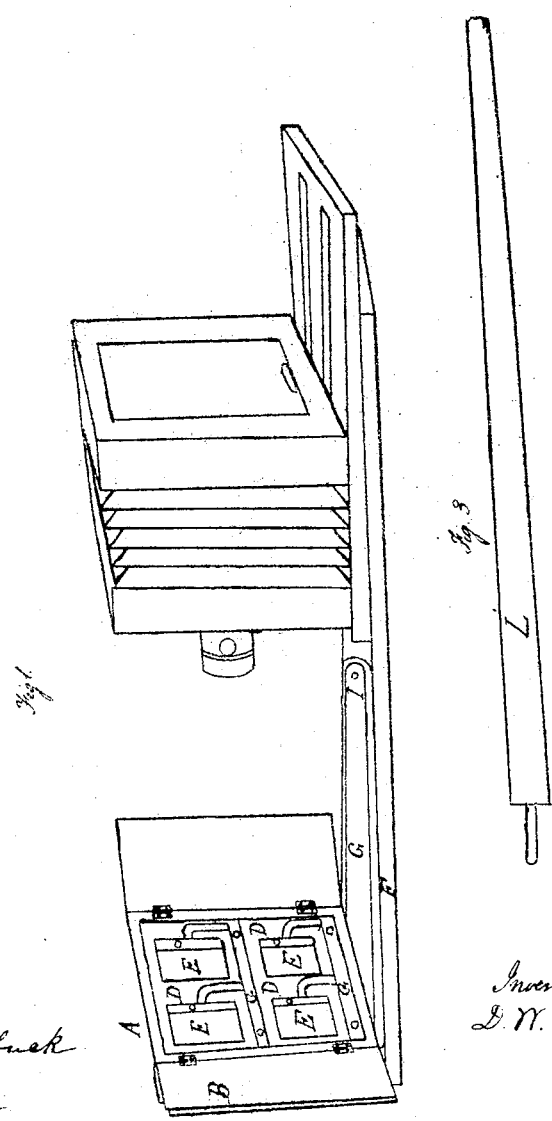
Witnesses
M. E. L. Chubbuck
E. Eichhorn
Inventor
D. W. S. Rawson

United States Patent Office.

D. W. S. RAWSON, OF PERU, ILLINOIS.

Letters Patent No. 71,911, dated December 10, 1867; antedated November 25, 1867.

MULTIPLYING-REFLECTORS FOR PHOTOGRAPHIC CAMERAS.

The Schedule referred to in these Letters Patent and making part of the same.

Be it known that I, D. W. S. RAWSON, of the city of Peru, La Salle county, State of Illinois, have invented an Improvement in Multiplying-Reflectors for Photographic Cameras, of which the following is a full and exact description, reference being had to the accompanying drawings, and the letters of reference thereon marked.

Figure 1 shows the reflector-box, base-board, and camera, with their relative positions.

Figure 2 shows a single reflector, and its connection to the cross-bars of the box.

Figure 3 shows the lever used for adjusting the reflectors.

The nature of my invention consists in arranging the reflectors in a box which protects them from cross-lights when in use, and from dust and handling when not in use; also hanging the mirrors on a universal pivot, so as to be easily moved by a small lever; and also preventing the lapping of one image on to the other, by intruding between the mirrors a non-reflecting surface.

To enable those skilled in the art to make and use my invention, I will describe its construction and operation.

I prepare a box, A, of sufficient size to contain all the mirrors to be used when arranged in rows and properly separated; with doors B B, which, when opened, serve as shade-wings; and cross-bars C C, to which are attached the reflectors E E, by means of the wire right-angles H H. The reflectors are of polished metal or plate looking-glass, and separated from each other from one-sixth to once the width of the reflectors, forming the division marked D D, which must be made as near photographically dead or non-reflecting as possible, by black paint or otherwise, as any reflection from between or outside the mirrors produces dimness of the pictures.

The reflectors are arranged in numbers corresponding to the number of images it is desired to produce at each exposure, and are adjusted by the lever L inserted in the hole O, shown in fig. 2. The reflector-box is usually attached to the end of the base-board F, which is of sufficient length to also hold the camera. But when it is desired to make more than one set of impressions on the same plate by moving the reflectors, the reflector-box is attached to the slide G, which is attached to the board F by the pivot I. The reflectors E E are mounted upon blocks, and fastened in the clamp S S by screws. The double-pivot H, with a screw at each end, allows the mirrors to be easily turned to all the necessary angles by the lever L, which may be of any convenient size, and, if used in front of the mirror, can be easily detached from it.

When it is desired to use the reflector-box, it is placed upon the camera-stand facing the subject, and the camera placed upon the base-board F, with the lens facing the reflectors, and the base-board turned sufficiently to allow an unobstructed passage of light from the subject to the mirrors; the operator then, with the lever, adjusts the several mirrors to each reflect the image to its proper place on the ground glass of the camera, and when all are so adjusted, the camera is focused, and the plate exposed in the usual way.

What I claim as my invention, and desire to secure by Letters Patent, is—

1. The reflector-box A, the doors and shade-wings B B, the bars C C, the non-reflecting division D D, surrounding and between the several mirrors, the base-board F, and the slide-board G, and the double pivot H, when used for the purposes herein described.

2. I claim the use of the lever for the purpose of adjusting the reflectors.

3. I claim the moving of the reflectors with the slide G, to produce more than one set of impressions on the same plate, or an equivalent movement.

D. W. S. RAWSON.

Witnesses:
M. E. L. CHUBBUCK,
E. EICHHORN.